(12) United States Patent
Nesvadba et al.

(10) Patent No.: US 9,357,153 B2
(45) Date of Patent: May 31, 2016

(54) METHOD AND APPARATUS FOR INTELLIGENT CHANNEL ZAPPING

(75) Inventors: Jan Alexis Daniel Nesvadba, Eindhoven (NL); Igor Alexandrovich Nagorski, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 260 days.

(21) Appl. No.: 11/570,807

(22) PCT Filed: Jun. 21, 2005

(86) PCT No.: PCT/IB2005/052028
§ 371 (c)(1), (2), (4) Date: Dec. 18, 2006

(87) PCT Pub. No.: WO2006/003543
PCT Pub. Date: Jan. 12, 2006

(65) Prior Publication Data
US 2008/0028427 A1    Jan. 31, 2008

(30) Foreign Application Priority Data
Jun. 30, 2004    (EP) .................................. 04103066

(51) Int. Cl.
*G06F 3/00* (2006.01)
*G06F 13/00* (2006.01)
(Continued)

(52) U.S. Cl.
CPC ........... *H04N 5/44543* (2013.01); *H04N 7/163* (2013.01); *H04N 21/4383* (2013.01);
(Continued)

(58) Field of Classification Search
CPC .................. H04N 5/44543; H04N 2005/4456; H04N 21/4532; H04N 2005/44569; H04N 21/482; H04N 21/4821; H04N 21/485

USPC .................... 725/9–21, 37, 39, 40–54, 56–61
See application file for complete search history.

(56) References Cited

U.S. PATENT DOCUMENTS 5,585,865 A    12/1996    Amano et al.
6,061,056 A *   5/2000    Menard et al. ................. 715/704
(Continued)

FOREIGN PATENT DOCUMENTS

JP    6217271 A    8/1994
JP    937181       2/1997
(Continued)

OTHER PUBLICATIONS

"Automatic Recognition of Film Genres" by Stephan Fischer, Rainer Lienhart and Wolfgang Effelsberg, 1995, International Multimedia Conference archive, Proceedings of the third ACM international conference on Multimedia pp. 295-304.*

*Primary Examiner* — Yassin Alata

(57) ABSTRACT

The availability of television channels today may easily be overwhelming for a user and the use of conventional linear zapping when a user switches sequentially between channels arranged in a list as a method of finding interesting content becomes still more inefficient. Thus, a method of automatically determining a channel content for multi-media, audio, and video channels distributed to or acquired by an electronic device is provided, the method comprises the steps of collecting channel data, analyzing the data using statistical methods to determine a channel content, and categorizing the channels into predetermined clusters depending on the channel content. The determination may be made dynamically so that the clusters reflect the specific day and/or time of the day at which the electronic device is used. Also a system for providing such a method is provided.

19 Claims, 2 Drawing Sheets

Figure 1:
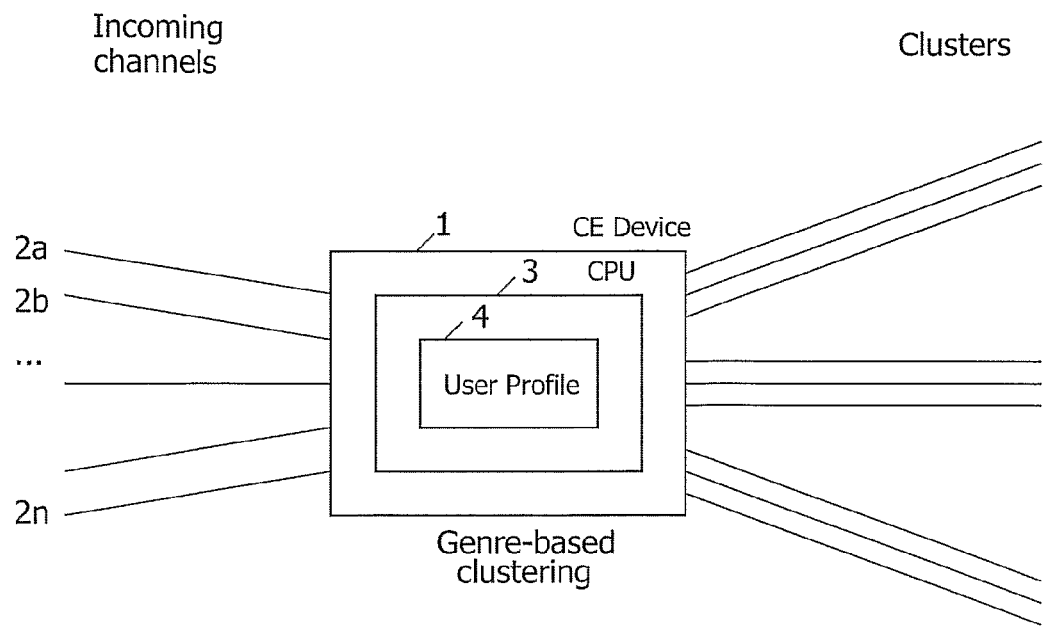

(51) Int. Cl.

| | |
|---|---|
| *H04N 5/445* | (2011.01) |
| *H04N 7/16* | (2011.01) |
| *H04N 21/438* | (2011.01) |
| *H04N 21/44* | (2011.01) |
| *H04N 21/45* | (2011.01) |
| *H04N 21/466* | (2011.01) |
| *H04N 21/485* | (2011.01) |

(52) U.S. Cl.
CPC ..... *H04N21/44008* (2013.01); *H04N 21/4532* (2013.01); *H04N 21/4666* (2013.01); *H04N 21/485* (2013.01)

(56) References Cited

U.S. PATENT DOCUMENTS

| | | |
|---|---|---|
| 6,147,714 A | 11/2000 | Terasawa et al. |
| 6,581,207 B1 | 6/2003 | Sumita et al. |
| 2001/0039657 A1 | 11/2001 | Fopeano et al. |
| 2002/0019826 A1 | 2/2002 | Tan |
| 2002/0056095 A1 | 5/2002 | Uehara |
| 2002/0083451 A1* | 6/2002 | Gill et al. ........................ 725/46 |
| 2002/0087988 A1 | 7/2002 | Lipscomb et al. |
| 2002/0194591 A1* | 12/2002 | Gargi ............................. 725/32 |
| 2003/0084452 A1* | 5/2003 | Ryan et al. ..................... 725/51 |
| 2003/0126602 A1 | 7/2003 | Han et al. |
| 2004/0117831 A1* | 6/2004 | Ellis et al. ...................... 725/53 |

FOREIGN PATENT DOCUMENTS

| | | |
|---|---|---|
| JP | 20000287189 A | 10/2000 |
| JP | 2001309269 A | 11/2001 |
| JP | 2003209755 A | 7/2003 |
| JP | 2003209756 A | 7/2003 |
| KR | 20010082261 | 8/2001 |
| WO | 0161445 A2 | 8/2001 |
| WO | 0182621 A1 | 11/2001 |
| WO | 02093928 A2 | 11/2002 |
| WO | 2004019527 A | 3/2004 |

* cited by examiner

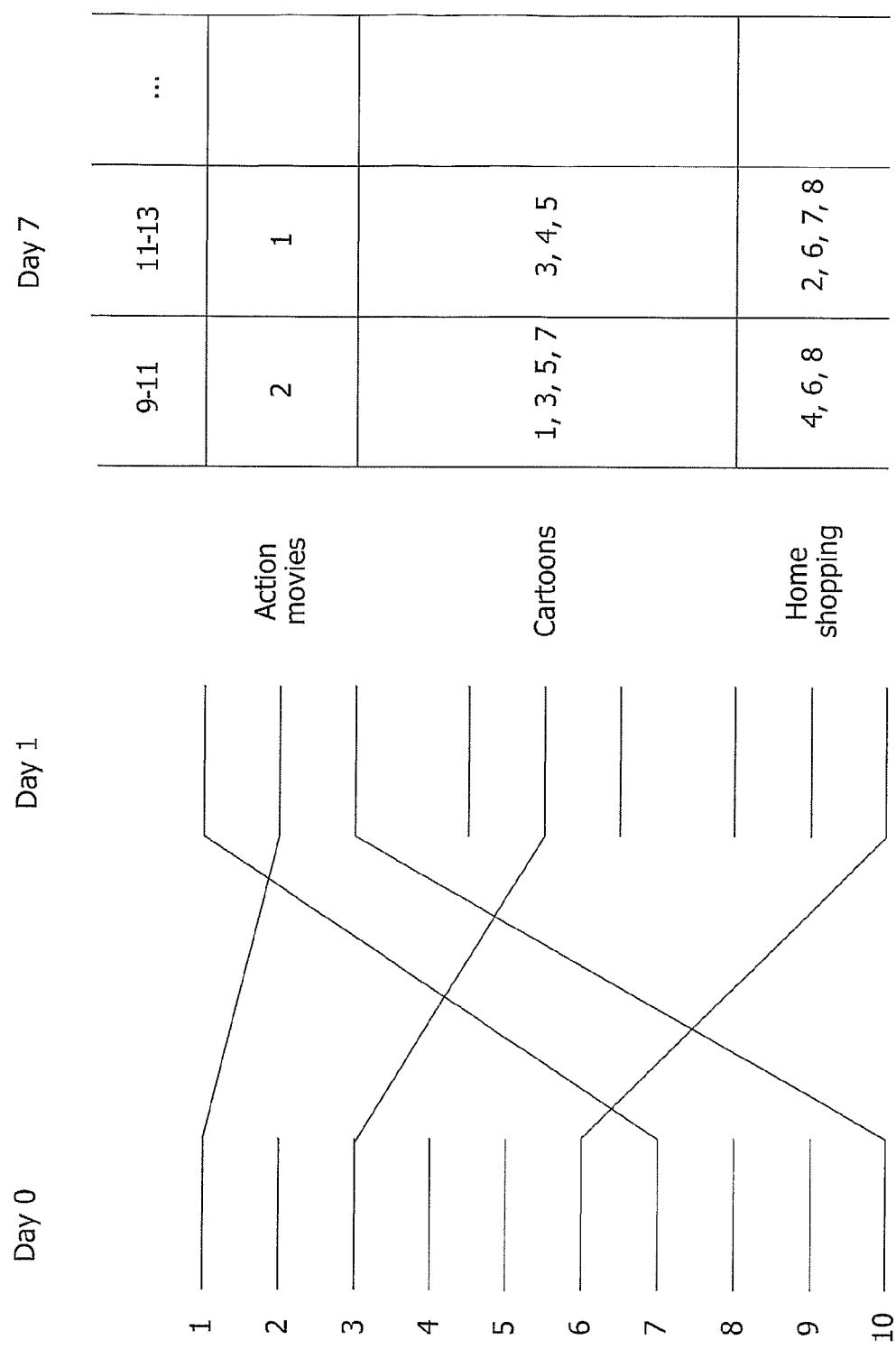

METHOD AND APPARATUS FOR INTELLIGENT CHANNEL ZAPPING

The invention relates to the field of automatically and/or dynamically determining a channel content for channels e.g. television channels present on an electronic device, such as a television set, and a system for providing this automatically and/or dynamically determination of content.

The availability of television channels today may easily be overwhelming for a user and the use of conventional linear zapping when a user switches sequentially between channels arranged in a list as a method of finding interesting content becomes still more inefficient.

The number of offered channels or other sources of information is so large that it is difficult for the user to select the individually most interesting program and looking for programs within program guides is due to time constraints often limited to a rather small subset of channels.

A user may arrange channels into short lists according to the users preferences. This however requires a lot of manual programming and furthermore an in depth knowledge of the content of the different channels which knowledge becomes more unlikely or incomplete as the number of channels increases.

Furthermore, the arrangement of channels according to preferences becomes complicated of the fact that many channels undergo a significant variation in genre over the day, and e.g. showing kid cartoons in the morning hours, talk shows during noon, soaps during the afternoon, news early evening, movies in the evening and adult entertainment at night.

Thus, the content of short lists made in the evening does not correspond to the content during the day.

Another possible way of finding interesting content is provided by electronic program guides (EPG), radio data systems (RDS) and various teletext applications, all providing information on channel genres, provide program listings for the channels, contain parental advice, etc. Typically, these applications are not sufficiently objective, they are inconsistent or they may only be used with a specific service provider or a specific vendor.

It is the object of the present invention to provide a system, that facilitates the searching for a channel by a user, said user being interested in specific content.

The present invention provides a method of automatically determining a channel or source content for information sources or channels distributed to or acquired by an electronic device, the method comprises the steps of
  a) collecting channel data,
  b) analyzing the data using statistical methods to determine a channel content, and
  c) categorizing (or classification of) the channels into predetermined clusters depending on the channel content.

According to a further aspect of the present invention, a method of dynamically determining a channel content for channels present on an electronic device is provided, the method comprises the steps of
  a) collecting channel data,
  b) analyzing the data using statistical methods to determine a channel content, and continually repeating steps a) to b) during operation of the electronic device to achieve a dynamically determination of channel content.

Furthermore, a system for determining channel content is provided, the system comprising an electronic device having access to a multitude channels, and a processing unit for collection of channel data, comprising a statistical tool for analyzing the data, and categorizing means for classification of channels into predetermined clusters depending on the channel content.

The channels may comprise any information available to the electronic device, and the channels may be digital or analogue information sources, such as digital or analogue channels, they may be distributed or made available via cable, satellite, air, the Internet or via any other means of making channels available to an audience, for example, channels in the Internet may also be streamed, and channels may be sent as either multicast channels or directly to single users (e.g. peer-to-peer users).

The channels may be general purpose sources, such as television channels as ARD, NDR, BBC, etc., or they may be specialized sources, such as specialized television channels such as news channels, like CNN, CBS, music channels, such as TMF, MTV or sports channels Eurosport, etc. The channels available to the electronic device may further comprise channels stored at other storage spaces in the Internet, or in other networks, such as in broadband connected Planet, where e.g. communities share content. The communities content may be streamed or broadcasted as a channel.

The channel content may be any content distributed by these channels and may thus contain any content, the content comprising music, sports, news, movies, cartoons, and etc., but it is envisaged that this list is not in anyway exhaustive.

Collection of channel content data and analyzing of such data may be performed by any method suitable for content identification. The content identification may for example be provided by using pattern recognition, such as neural network based pattern recognition, such as by a method as disclosed in WO 2004/019527, or by using a content analysis apparatus according to WO 2002/093928.

The electronic device may be any means of presenting channels to a user and may thus comprise television sets, radios, computers, GPS's, etc.

The clusters may be predetermined so that a predetermined set of cluster categories is given, i.e. home shopping, movies, news, cartoons, etc. and the channels may then automatically be categorized into these predetermined clusters upon determination of channel content. The clusters may be genre-based, thus based on pre-defined generic patterns and may comprise genres as movies, kids, music, etc. or they may be similar-content-based, so that specific reference channel is used and then channels having a similar content is found. Such a reference channel may belong to one of the pre-defined genres or it can reside on the border, and hence the clusters based on similarity may be different from any of the genre-based clusters.

The genres may be overlapping groups, so that one item e.g. may be placed in multiple clusters. Furthermore, the clusters may be content instance based or event based, so that the cluster may comprise e.g. soccer goals, explosions, love scene, breaking news, etc. Still further, genres may also be clustered by other means such as e.g. mood: happy, sad or frightening content, etc.

The set of cluster categories and genres may also be extended by an update from an other electronic device (e.g. in a community) or an (e.g. Internet) service. In this way intelligent new grouping are possible.

Alternatively or additionally, the user may be able to select into which cluster categories the channels is to be categorized, comprising more or less categories than a standard setting. Using either way of categorizing, the necessary input from the user is limited and the categorization may be performed without any input from the user.

The automatic determination of channel content provides for automatic channel matching and automatic genre detection. Hereby, a user navigating in the channels may be able to send a request to the electronic device to find one or more channels corresponding to a reference channel so that a source providing similar content is found or so that channels having a pre-selected genre is found. The user navigating in the channels may also send a request to the electronic device to find one or more channels corresponding to a reference cluster.

The automatic determination may be done fast and within minutes so as to provide a first rough categorization or classification of the channels available, but to obtain a more reliable categorization, it is preferred to trace each channel for a longer period of time in order to identify the source content appropriately. This further categorization may take several minutes. Preferably, the first rough scan is immediately made available to the user.

In a preferred embodiment, the electronic device keeps track of user behavior to generate and/or maintain a user profile comprising channels or clusters being rated according to the user behavior.

The user profile may be defined by the user upon starting up of the system or upon addition of new users, and this user defined profile may be updated automatically according to the actual user behavior so as to maintain the user profile and keep it updated. Furthermore, the user profile may be received from an other electronic device or from an e.g. Internet based service. User profiles may used broadly and by reusing a user profile from an other device or another service there will be some start-up information so that the "cold start" problem of having no information available may be avoided.

A user need not define a user profile but may have the electronic device generating a user profile according to the specific user behavior.

When more users are using the same electronic device, and thus multiple users consume content on the same system, the system will try to generate a common group profile and generate a recommendation list of recommended channels according to the groups profile and/or preferences. Alternatively, each user using the electronic device may have separate user profiles. Hereby, individual members of e.g. a family may each have an individual user profile and further e.g. a family profile corresponding to the behavior of the family using the electronic device together.

The user profile may be used to achieve a more reliable categorization of sources in several ways. For example, channels or genres which are not favored by the user (e.g. home shopping) may be exclude form the analysis, more computational power may be spent on frequently used sources, e.g. sources having a high rating, so that processing resources of the electronic device used to collect and analyze channel data are assigned on the basis of the user profile and/or on user behavior. Furthermore, dynamic channels as e.g. general-purpose channels may be analyzed more often than static channels having a predetermined content, news, music, etc.

To obtain a dynamically channel content determination the steps a) to b) may be continually repeated during operation of the electronic device to achieve a dynamically determination of channel content.

Preferably, the continually repetition of steps a) and b) are performed in the background without interrupting the primary functions of the electronic device. This may be facilitated by an electronic device comprising at least 2 analogue tuners for analogue broadcasting, or at least two transponders for digital broad casting. However, for digital broadcasting a single transponder may suffice, provided that the categorization is limited to one transport stream. The digital transport stream may thus comprise several multiplexed content streams (i.e. channels or channels), which may be analyzed in parallel, provided that there is sufficient processing power present. The analogue tuner is only capable of receiving one content stream. Thus, when only one analogue tuner is present, the analysis is primarily performed during an idle state of the device, so that the system performs the determination when the user does not watch the channels.

By dynamically determining the channel content, the clusters may be set so that programs presently having a specific channel contents are omitted from the channels in the clusters, hereby could e.g. channels presently showing commercials be excluded, so that the frequent zapping to other channels during commercial breaks may be constrained to other channels not showing commercials. This feature of omitting specific content may also be provided by some other means, e.g. by using commercial detectors.

Furthermore, using dynamically determination of channel content, also specific events may be detected, such as e.g. goals (in for example a soccer match), explosions (in action movies or documentaries), news events, news speakers etc. The channels may be clustered upon event criteria. Naturally, in such classification each channel will almost for sure fall into multiple clusters, since it may comprise all sorts of events.

Figure 2:
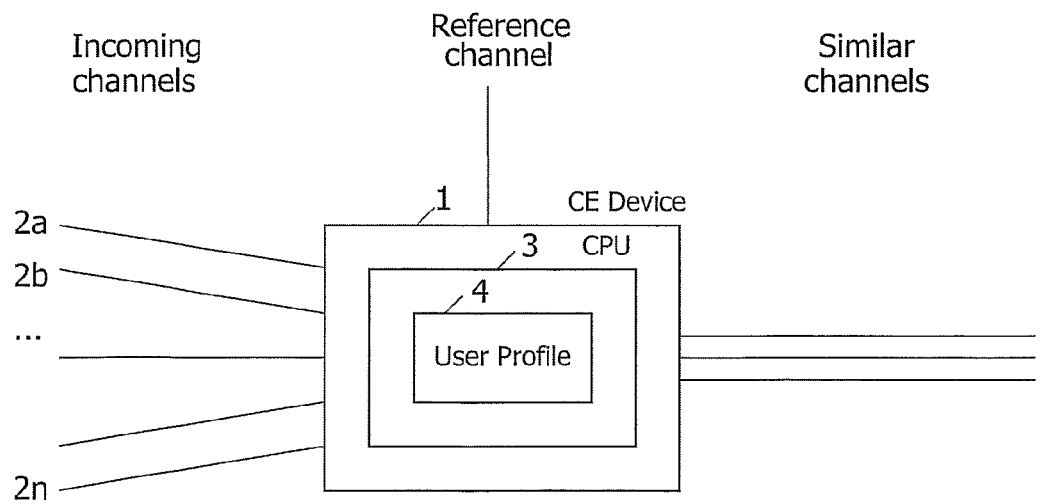

FIG. 1 shows the result of applying a user profile for categorizing the channels into pre-defined clusters, FIG. 2 shows a categorization of channels according to a reference channel, and FIG. 3 shows an example of applying a dynamically determination of source content.

FIG. 1 shows channels received on an electronic device 1 receiving a number of broadcasted channels 2a, 2b, . . . , 2n. The channels are provided to a processor 3 for collecting channel data and analyzing the data. The data are analyzed using statistical methods to determine a channel content, and the channels are categorized (or classified) into predetermined clusters depending on the channel content.

In a preferred embodiment, the electronic device is a television, but it may be any other electronic device capable of receiving distributed channels or capable of acquiring channels from locations in a network, like a set-top box or a video recorder with tuner.

The information sources or channels may comprise any type of content, such as audio, visual, video, multi-media content or any combination thereof, and the channels may be distributed via networks, such as the Internet, via local networks, or via other networks comprising channel storages, via peer-to-peer networks, they may be broadcasted using cables, fibers, etc. or by wireless data transmission via satellite or terrestrial.

The electronic 1 device may also be adapted to acquire channels, e.g. on request from a user. For example, the electronic device 1 may form part of a network comprising other electronic devices having channels accessible for the electronic device 1, by e.g. having the channels stored in a local storage. A user wanting to watch e.g. an action movie may then request the electronic device 1 to find an action movie. Upon receiving such a request, the electronic device 1 may then look into storages present in the network and find a corresponding movie, or a cluster of action movies, upon analyzation of the storages provided in the network.

The channels received by the electronic device 1 are clustered into predefined clusters, such as genre cluster, being cartoons, music, action movies, home shopping, etc. Furthermore, the clusters may be rated according to the user profile, either inter-cluster rated so that the favorite clusters are rated highest, in the specific example action movies are rated highest, then cartoons and having home shopping at the lowest rating. Also, intra-cluster rating may be provided so that the specific channels showing e.g. action movies are rated according to the user profile, so that for example the most frequently watched channel of the channels showing action movies has the highest rating.

The user profile 4 may either be provided by the user or be based on actual user behavior, the user behavior being monitored over time.

In FIG. 2, another embodiment of the present invention is shown. In this case there need not be a user profile, rather a user selects a reference channel and the processor analyses the channels distributed to or acquired by the electronic device so as to find similar channels. If there is a user profile present, the similar channels may be rated according to the user behavior.

There may be more than one tuner present in the electronic device, hereby different tuners can perform different operations. For example, one tuner may be used for watching a selected channel or for zapping, another tuner may be used for finding similar channels, another may be used for recording, etc. This may of course also be accomplished having one digital tuner capable of handling multiplexed channels.

Instead of selecting a reference channel, the user may select a reference event, such as a soccer goal, a specifically romantic scene, a murder, etc. and the channels in which such an event takes place may be clustered according to the specific events. A soccer goal may for example not only be shown on sport channels, but also on news channels, etc.

In FIG. 3, a dynamically determination of channel content is depicted. Upon starting up of the system at Day 0, the channels are categorized in to predefined static clusters, such as into clusters comprising action movies, cartoons, home shopping, etc. However, the determination of channel content may be continually performed over time, so that the categorization of the channels is refined.

Furthermore, by continuing to analyze the channel content, the fact that the channel content on many channels vary over time may be taken into account. For channels having a specific genre such as MTV or Eurosport, showing more or less the same content throughout the day, this may not change the categorization, however, also for e.g. Eurosport, the categorization may be refined so that specific sport subclasses may be provided, e.g. Formula 1, soccer, etc.

For more general type content channels, such as NBS, NDR, ARD, BBC, the continued determination on channel content may provide a categorization according to the scheme shown in FIG. 3 where only channel no. 2 shows action movies in the morning from 9-11, and channel 1 from 11-13, whereas the channels 1, 3, 5, and 7 show cartoons from 9-11, and channels 3, 4, and 5 show cartoons from 11-13. Home shopping is from 9-11 shown on channels 4, 6, and 8 and from 11-13 on channels 2, 6, 7 and 8. This clustering of the channels may be provided to the user, or it may just be used for providing similar content type channels to a user. Of course the times of the day provided in FIG. 3 are only examples, and furthermore, different time schemes may be provided for each channel and for each day.

When the determination process has been allowed to run for a couple of weeks and so that the results are accumulated in a database in order to track varying channel programming in different daytime and regarding the day of the week. Furthermore, when the determination process has acquired sufficient information, a separate clustering may be available for each particular time interval, with granularity varying from a couple of minutes to several hours. Hence, also weekday specific occurrences may be included in the structure, so that the system will know that the content of Saturday night is different from any weekday night content, etc.

Furthermore, the processor 3 may store information regarding national/regional holidays, local festivals, international events, such as a soccer champion ships, or any other events that might influence programming and take such holidays or events into consideration upon categorization of channels. This information may be pre-stored in the processor, the information may be transmitted from a user or the processor may obtain these data from any external source, such as via the Internet, broadcast to the processor, etc, which information may then be retrieved with or without input from the user.

Furthermore, if there is a sudden deviation from the found scheme of channel content, such as a deviation from the normal behaviour, it may be signalled to the user, or an automatic operation may be triggered or initiated, e.g. the recording of the content that deviates from the normal behaviour may be started, etc., as this may indicate that some global event has taken place. If all the channels suddenly shift to the news cluster, it may mean that a mayor event, such as the shooting of Kennedy, the 9 September or any other event having global impact may have occurred.

It is envisaged that the dynamic determination of content may be performed continually, it may be performed at regular intervals, such as once every hour, once every half-hour, etc.

However, for e.g. creation of 24×7 clustering, to keep track of events and to detect sudden global deviations, it is preferred that the dynamic determination is performed continually.

Furthermore, the dynamically detection of content may also be used to obtain key frames from channels, so that a user may be provided with a reliable overview screen of the channels available. The overview screen may comprise a combination of key frames representing the content on the channels available, and the combination of key frames may be used to create a reliable overview of the content being broadcasted at the moment. A screen picture may show a number of downsized scenes from the available channel, the scene being a small dynamic sequence, a shot or several shots, or a non-sequential selection of representative shots/scenes ("Movie-in-a-minute") per channel per last time period. These scenes and the display of the scenes on e.g. the TV screen may be grouped according to any of the clustering methods described above.

The scope of the invention is not limited to using statistical analysis to determine the content of the channel. Also other methods may be used like neural networks and fuzzy logic.

Furthermore, the invention may also be embodied with less components than provided in the embodiments described here, wherein one component carries out multiple functions. Just as well may the invention be embodied using more elements than depicted in FIG. 1, wherein functions carried out by one component in the embodiment provided are distributed over multiple components.

Also, it will be appreciated to a person skilled in the art that the invention may be carried out by a dedicated consumer electronics device just as well as by a general purpose computer programmed with a computer programme product comprising computer executable instructions for programming one or more processing units of said computer.

In summary, the invention relates to the following: The availability of television channels today may easily be overwhelming for a user and the use of conventional linear zapping when a user switches sequentially between channels arranged in a list as a method of finding interesting content becomes still more inefficient. Thus, a method of automatically determining a channel content for multi-media, audio, and video channels distributed to or acquired by an electronic device is provided, the method comprises the steps of collecting channel data, analyzing the data using statistical methods to determine a channel content, and categorizing the channels into predetermined clusters depending on the channel content. The determination may be made dynamically so that the clusters reflect the specific day and/or time of the day at which the electronic device is used. Also a system for providing such a method is provided.

The invention claimed is:

1. A method of automatically re-classifying a plurality of channels, the method comprising acts of:
    on a user's electronic device,
        for each of the plurality of channels and a plurality of time intervals, receiving content including audio, video, and/or multi-media;
    receiving selection of a reference channel;
    analyzing the reference channel to identify the content of the reference channel;
    creating a reference genre based on the identified content of the reference channel;
    for each of the plurality of time intervals
    automatically detecting correspondence of the content received from each of the plurality of channels to at least one of a plurality of genres including the reference genre; and
    categorizing at least a portion of the plurality of channels into a reference cluster depending on the detected correspondence of the content received from each of the plurality of channels to the reference genre.

2. The method according to claim 1, further comprising an act of identifying to the electronic device the reference channel.

3. The method according to claim 1, further comprising an act of identifying to the electronic device the reference genre.

4. The method according to claim 1, further comprising acts of tracking user behavior and generating a user profile comprising the channels and genres rated according to the user behavior.

5. The method according to claim 4, wherein processing resources used for detecting are assigned on a basis of the user profile.

6. The method according to claim 1, further comprising an act of repeating the acts of detecting and categorizing to achieve a dynamic determination of the genre including the reference genre of the content.

7. The method according to claim 6, wherein the repeating is performed without interrupting tuning, reception, and/or transponding functions of the electronic device.

8. The method according to claim 1, wherein the act of automatically detecting includes detecting specific events in the content of each channel.

9. The method according to claim 1, wherein the content comprises specific events that relate to the plurality of genres.

10. The method according to claim 1, further comprising an act of notifying a user or initiating an automatic operation responsive to a sudden change of the genre of a group of the plurality of channels to a same genre from one or more prior genres.

11. The method according to claim 1, further comprising an act of using statistical analysis to analyze the receiving content.

12. The method according to claim 1, further comprising an act of using fuzzy logic to determine the content.

13. The method according to claim 1, wherein the detecting and categorizing acts are periodically executed to determine the genre of the plurality of channels at various time intervals.

14. The method according to claim 13, wherein the categorizing of the plurality of channels is determined at one or more predetermined daily or weekly time intervals.

15. The method according to claim 13, further comprising an act of changing characterization of any of the plurality of channels when the genre of the channel changes.

16. The method according to claim 1, wherein said act of detecting includes using pattern recognition as applied to said content.

17. A method for dynamically re-classifying a plurality of channels, the method comprising acts of:
    during operation of a user's electronic device,
        for each of the plurality of channels and a plurality of time intervals receiving content including audio, video, and/or multi-media;
    receiving selection of a reference channel;
    analyzing the reference channel to identify the content of the reference channel;
    creating a reference genre based on the identified content of he reference channel:
    for each of the plurality of time intervals
    repeatedly using statistical methods to automatically detect correspondence of the content received from each of the plurality of channels to at least one of a plurality of genres including the reference genre; and
    dynamically categorizing at least a portion of the plurality of channels into a reference cluster depending on the detected correspondence of the content received from each of the plurality of channels to the reference genre.

18. A system for re-classifying a plurality of channels, the system comprising:
    an electronic user's device including a plurality of channels providing content over a plurality of time intervals, the content including audio, video, and/or multi-media;
    a processor configured to receive selection of a reference channel;
    analyze the reference channel to identify the content of the reference channel;
    create a reference genre based on the identified content of the reference channel;
    automatically detect correspondence of the content received from each of the plurality of channels to at least one of a plurality of genres including the reference genre; and
    categorize at least a portion of the plurality of channels into a reference cluster depending on the detected correspondence of the content received from each of the plurality of channels to the reference genre.

19. A non-transitory computer readable medium including program instructions, which when executed on a computer having a processor perform a method for automatically re-classifying of a plurality of channels to the processor, the method comprising acts of:
    on the processor of a user's electronic device,
        for each of the plurality of channels receiving content over a plurality of time intervals, the content including audio, video, and/or multi-media corresponding to at least one of a plurality of genres;
    receiving selection of a reference channel;
    analyzing the reference channel to identify the content of the reference channel;
    creating a reference genre based on the identified content of the reference channel;
    for each of the plurality of time intervals automatically detecting correspondence of the content received from each of the plurality of channels to at least one of a plurality of genres including the reference genre, and categorizing at least a portion of the plurality of channels into a reference cluster depending on the detected correspondence of the content received from each of the plurality of channels to the reference genre.

\* \* \* \* \*